US010257343B2

(12) United States Patent
Alameh et al.

(10) Patent No.: US 10,257,343 B2
(45) Date of Patent: *Apr. 9, 2019

(54) PORTABLE ELECTRONIC DEVICE WITH PROXIMITY-BASED COMMUNICATION FUNCTIONALITY

(71) Applicant: Motorola Mobility LLC, Chicago, IL (US)

(72) Inventors: Rachid M Alameh, Crystal Lake, IL (US); Kevin J McDunn, Lake in the Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,539

(22) Filed: Mar. 27, 2017

(65) Prior Publication Data

US 2017/0201620 A1    Jul. 13, 2017

Related U.S. Application Data

(63) Continuation of application No. 14/718,550, filed on May 21, 2015, now Pat. No. 9,635,156.

(51) Int. Cl.
| | |
|---|---|
| *H04B 1/00* | (2006.01) |
| *H04M 1/725* | (2006.01) |
| *H04L 12/58* | (2006.01) |
| *H04M 1/64* | (2006.01) |

(52) U.S. Cl.
CPC ........ *H04M 1/72569* (2013.01); *H04L 51/02* (2013.01); *H04M 1/64* (2013.01); *H04M 1/725* (2013.01); *H04L 51/043* (2013.01); *H04M 1/72552* (2013.01); *H04M 2203/2005* (2013.01); *H04M 2250/12* (2013.01)

(58) Field of Classification Search
CPC . H04B 1/3838; H04M 1/72516; H04W 4/008
See application file for complete search history.

(56) References Cited

U.S. PATENT DOCUMENTS

| 8,704,152 B2* | 4/2014 | Svajda ................. G01S 3/7803 250/221 |
|---|---|---|
| 9,426,525 B2* | 8/2016 | Soundararajan ........................... H04N 21/44218 |
| 2010/0105423 A1* | 4/2010 | Gupta ................. H04M 1/7253 455/550.1 |
| 2012/0064924 A1* | 3/2012 | Schapsis ............. H04L 12/5805 455/466 |
| 2015/0133098 A1* | 5/2015 | Warr .................... H04M 3/436 455/418 |

* cited by examiner

*Primary Examiner* — Tuan Pham
(74) *Attorney, Agent, or Firm* — Philip H. Burrus, IV

(57) ABSTRACT

An electronic device includes a housing and one or more processors. At least one proximity sensor component is operable with the one or more processors and can include an infrared signal receiver to receive an infrared emission from an object external to the housing. The one or more processors can receive, with a communication circuit, an incoming communication from a remote communication device and determine whether a person is within a thermal reception radius of the at least one proximity sensor component. Where the person is not within the thermal reception radius, the one or more processors can perform a control operation in response to receiving the incoming communication.

20 Claims, 13 Drawing Sheets

PORTABLE ELECTRONIC DEVICE WITH PROXIMITY-BASED COMMUNICATION FUNCTIONALITY

CROSS REFERENCE TO PRIOR APPLICATIONS

This application is a continuation of U.S. application Ser. No. 14/718,550, filed May, 21, 2015, which is incorporated by reference for all purposes.

BACKGROUND

Technical Field

This disclosure relates generally to electronic devices, and more particularly to portable electronic devices having proximity sensors.

Background Art

Proximity sensors detect the presence of nearby objects before those objects contact the device in which the proximity sensors are disposed. Illustrating by example, some proximity sensors emit an electromagnetic or electrostatic field. A receiver then receives reflections of the field from the nearby object. The proximity sensor detects changes in the received field to detect positional changes of nearby objects based upon changes to the electromagnetic or electrostatic field resulting from the object becoming proximately located with a sensor.

For example, when a device determines that a user's face is proximately located with the device, the device may reduce speaker volume so as not to over stimulate the user's eardrums. As another example, the proximity sensor may turn off the device display when the device is positioned near the user's ear to save power. It would be advantageous to have an improved proximity sensor and associated systems and devices.

Figure 1:
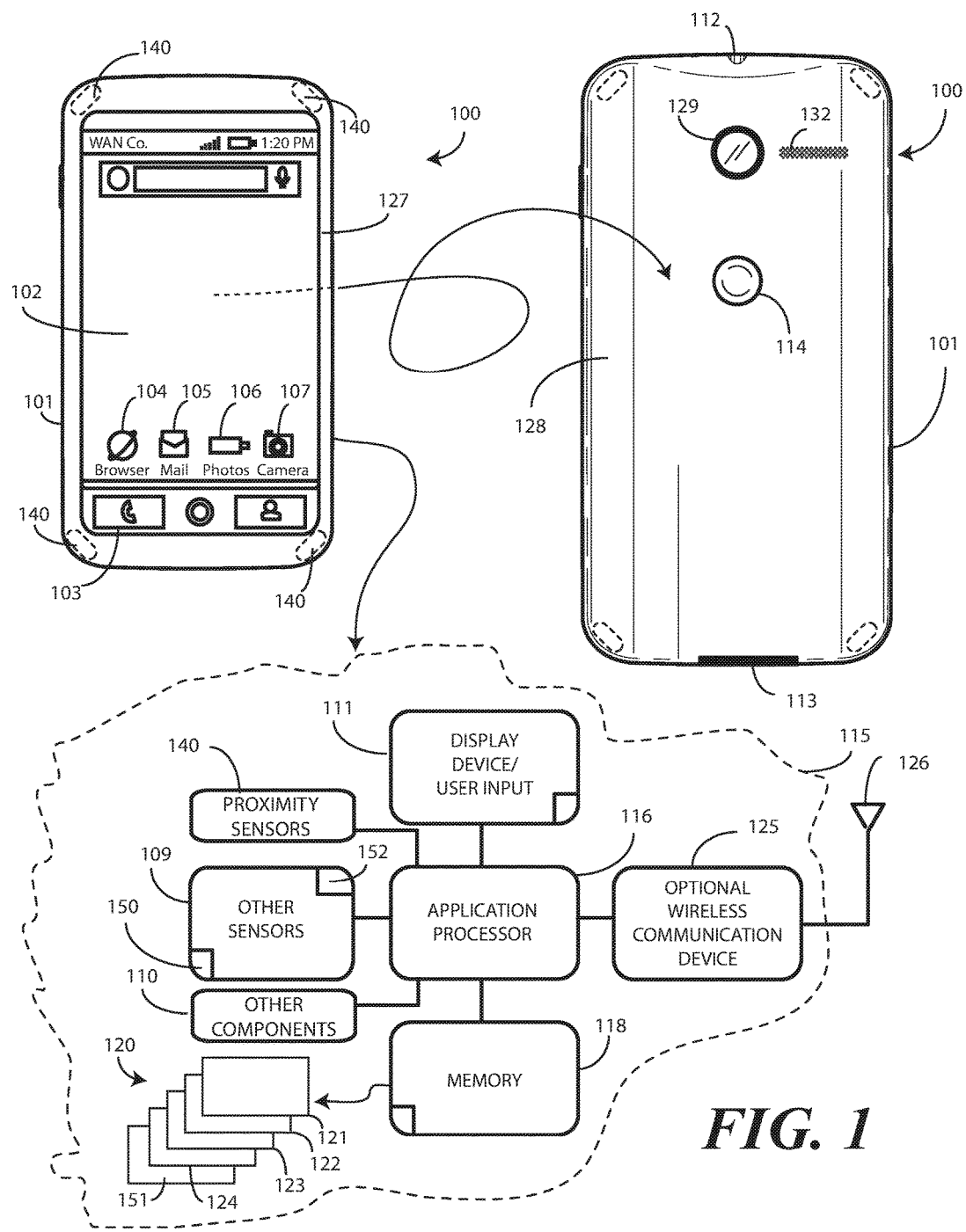
FIG. 1 illustrates one explanatory portable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using proximity sensor components to perform control operations in an electronic device, including the transmission of reply messages when a user is away from the device. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of performing control operations and/or responding to incoming messages as described herein. The non-processor circuits may include, but are not limited to, a radio receiver, a radio transmitter, signal drivers, clock circuits, power source circuits, and user input devices. As such, these functions may be interpreted as steps of a method to perform device control in response to incoming messages using to one or more proximity sensors components. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device capable of automatically replying to an incoming message, such as an instant message, electronic mail, or short message service message, when a person is away from the device. In one or more embodiments, the electronic device includes at least one proximity sensor component operable with the one or more processors to receive an infrared emission from an object external to the housing. When an incoming message is received, the one or more processors of the electronic device can determine whether a person, which is preferably the owner of the device, is within a thermal reception radius of the proximity sensor components. When the user is away from the device, the one or more processors can perform a control operation in response to receiving the incoming communication. In one embodiment, the control operation comprises delivering, with a communication circuit, a response message to a remote communication device.

In one or more embodiments, performance of the control operation can depend upon an amount of time the user is away from the device. For example, a user who leaves a smartphone on their desk while running down the hall to the restroom may not want an automatic response message sent ten seconds after they leave the office. Accordingly, in one or more embodiments the one or more processors can detect when the user leaves the thermal reception radius and can initiate a timer. Only after the user has been away from the device for a predetermined time, such as five minutes, will the one or more processors send the reply message when operating in this configuration.

Embodiments of the disclosure provide an electronic device, which may be portable in one or more embodiments, having a housing. The housing can include a front major face, a rear major face, a first side edge, and a second side edge. In one embodiment, a display or other user interface component is disposed along the front major face. One or more processors can be operable with the display or user interface.

In one embodiment, the electronic device has at least one proximity sensor component that is operable with the one or more processors. In one embodiment, the at least one proximity sensor component comprises a receiver only, and does not include a corresponding transmitter. As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter.

Illustrating by example, in one the proximity sensor component comprises a signal receiver to receive signals from objects external to the housing of the electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being. Additionally, detection of wavelengths in this range is possible from farther distances than, for example, would be the detection of reflected signals from the transmitter of a proximity detector component.

In one or more embodiments, each proximity sensor component is disposed about a perimeter of the housing along minor faces of the housing. For example, in one explanatory embodiment four proximity sensor components are disposed at the corners of the housing. In other embodiments, additional proximity sensors can be included. For example, in another embodiment four proximity sensors can be disposed at corners of the device while four additional proximity sensors are disposed along the sides of the housing. This results in eight proximity sensors being used. While the use of additional proximity sensor components can help to increase location and distance resolution, they also increase the cost. Thus, in one embodiment only four proximity sensor components, disposed at the corners of the electronic device, are used.

In one embodiment, each proximity sensor component is disposed behind a grille defining a plurality of distinct reception beams. The plurality of reception beams has associated therewith a reception angle. In one embodiment, to achieve a full 360-degree proximity detection coverage about the device, each reception angle is obtuse, i.e., greater than ninety degrees, such that the reception angle of any one proximity sensor component overlaps the reception angle of at least one other proximity sensor component. In one embodiment, where four proximity sensor components are disposed at the corners of the housing, the reception angle of any one proximity sensor component overlaps at least two other reception angles of at least two other proximity sensor components to provide 360-degree coverage.

In one embodiment, the one or more processors operate in conjunction with the plurality of proximity detector components to detect a person is within a thermal reception radius of the electronic device. When an incoming communication from a remote communication device is received, the one or more processors receive electronic signals from the plurality of proximity detector components to determine whether a person is within a thermal reception radius of at least one proximity sensor component. Where the person is not within the thermal reception radius, the one or more processors can perform a control operation, such as sending an automatic reply message, in response to receiving the incoming communication.

In one or more embodiments, the reply message is user definable. Initially, using a user interface, a user can elect to enable the automatic reply feature. Where the feature is enabled, in one embodiment a user can define the message to be sent as the automatic reply. In other embodiments, the content can change as a function of time, the distance the user is from the electronic device, or other factors.

In one or more embodiments, the automatic reply can even be sent when people are within the thermal reception radius. Embodiments of the disclosure contemplate that people other than the owner of the electronic device may be within the thermal reception radius of the electronic device while the user is away. In one or more embodiments, the one or more processors attempt to identify people within the thermal reception radius to determine if any is the owner. Accordingly, where the owner is not identified, the one or more processors infer that the owner is not around the electronic device, and can therefore automatically reply to incoming messages to alert senders of those messages that the owner of the electronic device is unable to respond.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface 111 of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes two housing members. A front housing member 127 is disposed about the periphery of the display 102 in one embodiment. A rear-housing member 128 forms the back-side of the electronic device 100 in this illustrative embodiment and defines a rear major face of the electronic device. Features can be incorporated into the housing members 127,128. Examples of such features include an optional camera 129 or an optional speaker port 132, which are shown disposed on the rear major face of the electronic device 100 in this embodiment, but could be disposed along the front major face of the electronic device 100 as well about the display 102. In this illustrative embodiment, a user interface component 114, which may be a button or touch sensitive surface, can also be disposed along the rear-housing member 128.

In one embodiment, the electronic device 100 includes one or more connectors 112,113, which can include an analog connector, a digital connector, or combinations thereof. In this illustrative embodiment, connector 112 is an analog connector disposed on a first edge, i.e., the top edge, of the electronic device 100, while connector 113 is a digital connector disposed on a second edge opposite the first edge, which is the bottom edge in this embodiment.

A block diagram schematic 115 of the electronic device 100 is also shown in FIG. 1. In one embodiment, the electronic device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable with one or more user interface devices 111, which can include the display 102, to present presentation information to a user. The executable software code used by the one or more processors 116 can be configured as one or more modules 120 that are operable with the one or more processors 116. Such modules 120 can store instructions, control algorithms, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a photo application 106 configured to permit the user to view images or video on the display 102 of electronic device 100, and a camera application 107 configured to capture still (and optionally video) images. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one embodiment, a plurality of proximity sensor components 140 can be operable with the one or more processors 116. In one embodiment, the proximity sensor components 140 comprise only signal receivers. In one embodiment, the proximity sensor components 140 comprise infrared receivers. For example, in one embodiment the proximity sensor components 140 comprise signal receivers that receive infrared wavelengths of about 860 nanometers. In one embodiment, the proximity sensor components 140 have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

In one embodiment, each proximity sensor component 140 comprises an infrared signal receiver so as to be able to detect infrared emissions from a person. This is sometimes referred to as a "passive IR system" due to the fact that the person is the active transmitter. Accordingly, the proximity sensor component 140 requires no transmitter since objects disposed external to the housing deliver emissions that are received by the infrared receiver. As no transmitter is required, each proximity sensor component 140 can operate at a very low power level. Simulations show that a group of infrared signal receivers can operate with a total current drain of just a few micro amps.

In one embodiment, the signal receiver of each proximity sensor component 140 can operate at various sensitivity levels so as to cause the at least one proximity sensor component 140 to be operable to receive the infrared emissions from different distances. For example, the one or more processors 116 can cause each proximity sensor component 140 to operate at a first "effective" sensitivity so as to receive infrared emissions from a first distance. Similarly, the one or more processors 116 can cause each proximity sensor component 140 to operate at a second sensitivity, which is less than the first sensitivity, so as to detect infrared emissions from a second distance, which is less than the first distance. In this case the one or more processors 116 can adjust the detection threshold to control the detection distance. The sensitivity change can be effected by causing the one or more processors 116 to interpret readings from the proximity sensor component 140 differently. For example, when the electronic device 100 is grabbed, only large readings from the proximity sensor component 140 might cross a less-sensitive threshold set during device grab to be used to control the electronic device 100. In other embodiments, the proximity sensor component 140 can be designed to have changing detection thresholds.

Figure 2:
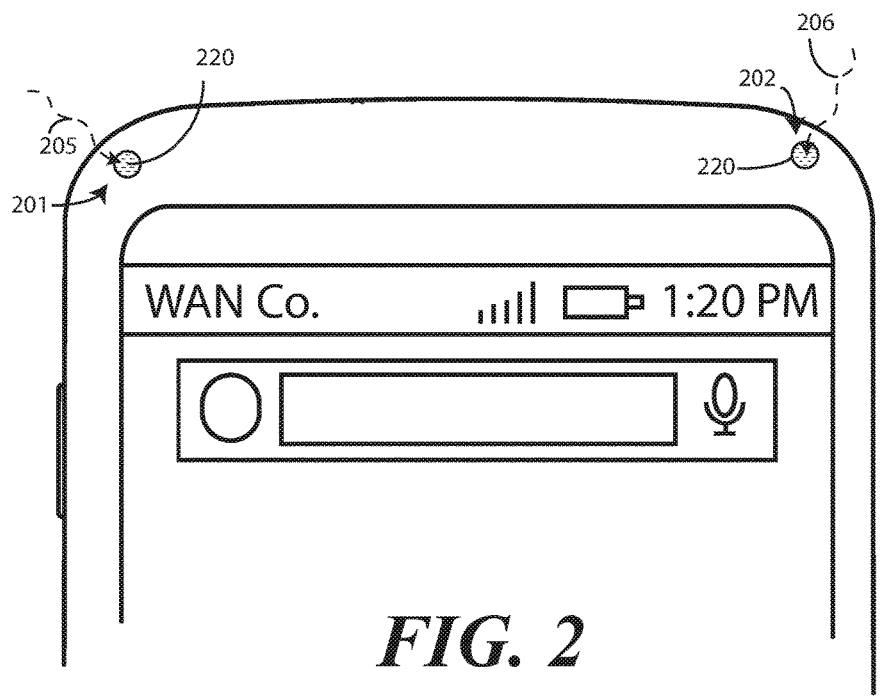
FIG. 2 illustrates explanatory proximity sensor component configurations in accordance with one or more embodiments of the disclosure.

Turning briefly to FIG. 2, illustrated therein are two proximity sensor components 201,202, each disposed at a corner of the electronic device 100. In this embodiment, each proximity sensor component 201,202 comprises a signal receiver 220, such as an infrared photodiode, to detect an infrared emission 205,206 from an object external to the housing 101 of the electronic device 100. No corresponding transmitter is included or required for the proximity sensor component 201,202 to function. As no active transmitter emitting signals is included, each proximity sensor component 201,202 is sometimes referred to as a "passive" proximity sensor.

Figure 3:
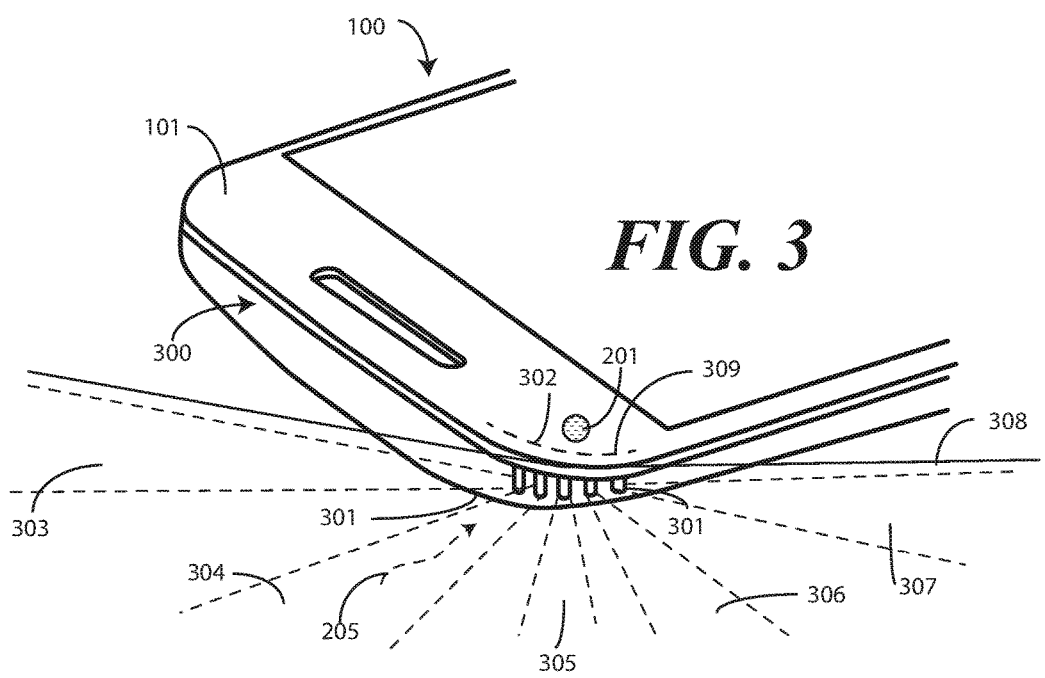
FIG. 3 illustrates one explanatory proximity sensor component configuration in accordance with one or more embodiment of the disclosure.

In one embodiment, the proximity sensor components 201,202 can include at least two sets of components. For example, a first set of components can be disposed at a first corner of the electronic device 100, while another set of components can be disposed at a second corner of the electronic device 100. As shown in FIG. 3, in one embodiment each proximity sensor component 201 can be disposed about a perimeter 300 of the electronic device 100. In one embodiment, the proximity sensor components 201 are disposed at a corner 301 of the electronic device 100. As will be shown with reference to FIG. 4 below, proximity sensor components can be disposed in other locations as well.

In one embodiment, each proximity sensor component 201 is disposed behind a grille 302 that defines one or more apertures through which infrared emissions 205 are received. In one embodiment, the grille 302 can define one or more reception beams 303,304,305,306,307 in which infrared emissions 205 can be received. A reception angle 308 is defined by the angular range at which infrared emissions 205 can be received by a particular proximity sensor component 201. In one or more embodiments, to provide 360-degree coverage about the housing 101 of the electronic device 100, the reception angle for each proximity sensor component 201 is obtuse such that it overlaps with at least one other beam reception angle of at least one other proximity sensor component.

The definition of such reception beams advantageously can enable the proximity sensor components 201 to detect not only the location of an object relative to the housing 101, but also whether one or multiple objects are within a thermal detection radius. Embodiments of the disclosure contemplate that there is a high value in not only detecting presence or motion of a user in a 360-degree coverage area provided by the proximity sensor components 201, but also in determining where the exact user position is relative to electronic device 100. The use of the grille 302 and its corresponding reception beams 303,304,305,306,307 allows for the detection of multiple people about the housing 101 of the electronic device 100, even when those people are close to one another and not just in separate quadrants as in the case of four proximity sensor components (140) as shown in FIG. 1 above. Advantageously, in one or more embodiments this can be accomplished using only four proximity sensor components, which reduces cost and simplifies the overall design. In one embodiment this is accomplished by using the reception beams 303,304,305,306,307 and overlapping the reception angle 308 where multiple proximity sensor components are used to assess user location via triangulation. This will be described in more detail in the subsequent figures. In one or more embodiments, the proximity sensor components 201 can also detect changes across reception beams to detect motion as well.

The apertures of the grille 302 can be used to define various reception beams 303,304,305,306,307. In one embodiment, each grille 302 can be associated with a lens 309 disposed behind, outside, or integrally with the grille 302 to assist with the definition of the reception beams and/or serve as a water dust seal. For example, a polycarbonate lens 309 can be disposed behind the grille 302 and configured as a compound Fresnel lens with a predetermined number of slits, such as five or seven, to assist with the definition of the reception beams.

Figure 4:
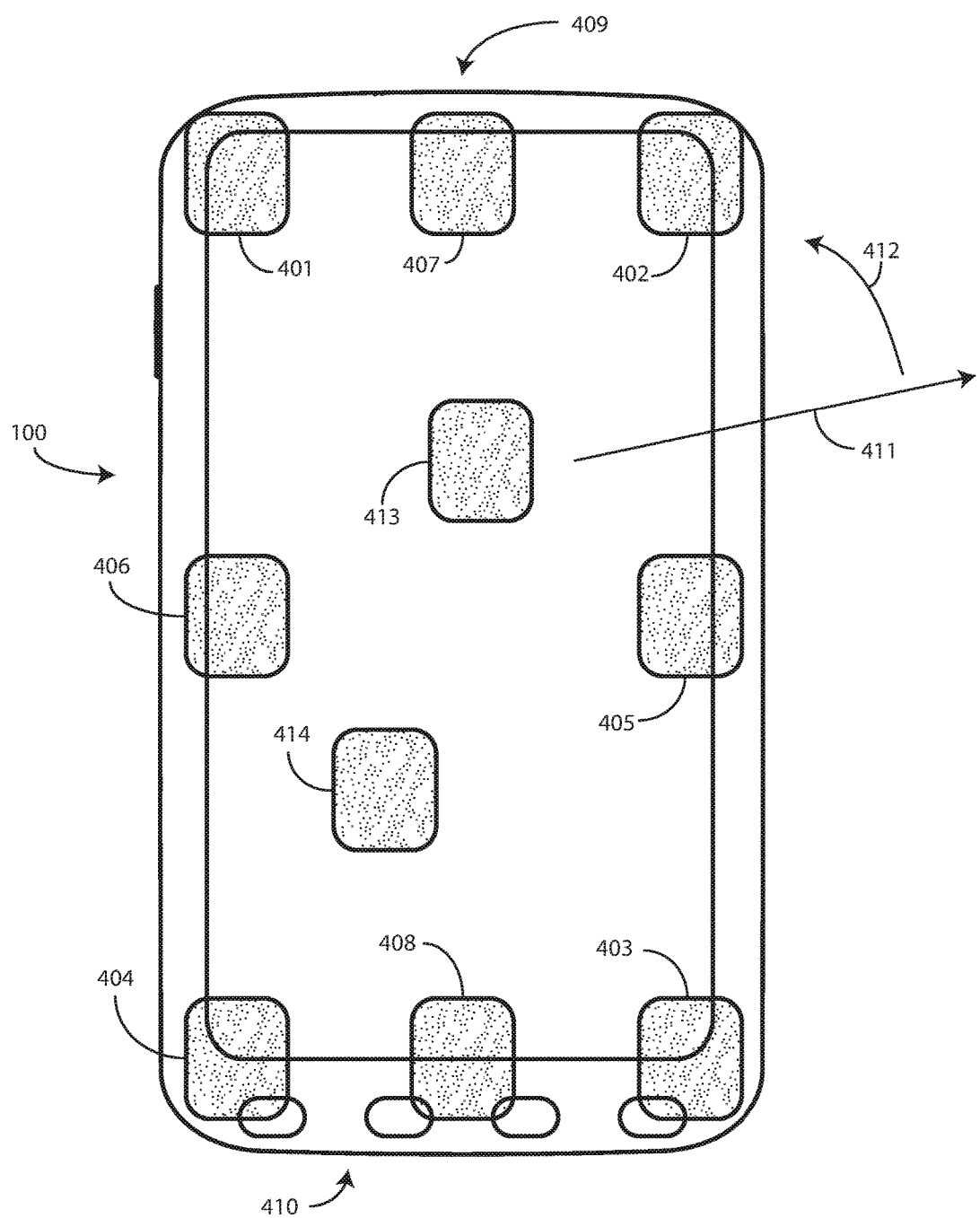
FIG. 4 illustrates explanatory locations along an electronic device where one or more proximity sensor components can be disposed in accordance with one or more embodiments of the disclosure.

It should be noted that corners 301 are not the only location at which proximity sensor components can be located. Turning now to FIG. 4, illustrated therein are some of the many locations at which proximity sensor components may be located. These locations include corner locations 401,402,403,404, edge locations 405,406, end locations 407,408, major face locations 413, or ad hoc locations 414 based upon location. These locations can be used individually or in combination to achieve the desired thermal reception radius 411 and radial detection sweep 412 about the electronic device 100. For example, some components can be disposed along the front major face of the electronic device 100, while other components are disposed on the rear major face of the electronic device 100, and so forth. Other locations and combinations will be obvious to those of ordinary skill in the art having the benefit of this disclosure.

In one or more embodiments, the plurality of proximity sensor components comprises only four proximity sensor components disposed only at the corner locations 401,402, 403,404 of the housing 101 on a one-proximity sensor component to one corner location basis, respectively. In one embodiment, two corner locations 401,402 are disposed at a first end 409 of the electronic device 100, while the two other corner locations 403,404 are disposed at a second end 410 of the electronic device 100. In this illustrative embodiment, the first end 409 is the top of the electronic device 100, while the second end 410 is the bottom of the electronic device 100. Where each proximity sensor component includes obtuse, overlapping reception angles (308), a 360-degree coverage about the housing 101 can be achieved using only four proximity sensor components.

Turning now back to FIG. 1, in one embodiment, the one or more processors 116 may generate commands to perform control operations based on information received from one or more proximity sensor components 140. The one or more processors 116 may generate commands based upon information received from a combination of the one or more proximity sensor components 140 and one or more other sensors 109. The one or more processors 116 may process the received information alone or in combination with other data, such as the information stored in the memory 118.

The one or more other sensors 109 may include a microphone, and a mechanical input component such as button or key selection sensors, touch pad sensor, touch screen sensor, capacitive sensor, and switch. Touch sensors may used to indicate whether the device is being touched at side edges, thus indicating whether or not certain orientations or movements are intentional by the user. The other sensors 109 can also include surface/housing capacitive sensors, audio sensors, and video sensors (such as a camera).

The other sensors 109 can also include motion detectors, such as an accelerometer 152 or a gyroscope. For example, an accelerometer 152 may be embedded in the electronic circuitry of the electronic device 100 to show vertical orientation, constant tilt and/or whether the device is stationary.

In one embodiment, the other sensors 109 can further include an intelligent imager 150 that is configured to capture an image of an object and determine whether the object matches a predetermined criterion. For example, the intelligent imager 150 can be operable with an identification module 151 configured with optical recognition such as include image recognition, character recognition, visual recognition, facial recognition, color recognition, shape recognition and the like. Advantageously, the identification module 151 can be used with the intelligent imager 150 as a facial recognition device to determine the identity of one or more persons detected about the electronic device 100. For example, in one embodiment when the one or more proximity sensor components 140 detect a person, the intelligent imager can capture a photograph of that person. The identification module 151 can then compare the image to a reference file stored in memory 118, to confirm beyond a threshold authenticity probability that the person's face sufficiently matches the reference file. Beneficially, optical recognition allows the one or more processors to enter the normal mode of operation only when one of the persons detected about the electronic device 100 are sufficiently identified as the owner of the electronic device.

In other embodiments, the identification module 151 can be operable with an audio input, such as a microphone included with the other sensors 109. Accordingly, the identification module 151 can sample sounds when the one or more proximity sensor components 140 detect a person within a reception radius. The identification module 151 can then compare the sampled audio file to a reference file stored in memory 118, to confirm beyond a threshold authenticity probability that the person's voice profile sufficiently matches the reference file. Accordingly, in one or more embodiments the memory 118 can hold identification information that allows the identification module 151 to identify an owner of the electronic device 100 by comparing the captured audio information with the reference identification information in a voice identification process. While facial recognition and audio recognition are two possible ways of identifying a user in accordance with one or more embodiments, other identification techniques will be obvious to those of ordinary skill in the art having the benefit of this disclosure. For example, the one or more processors 116 may identify a user with the communication circuit 125 when the user is wearing a device that communicates with the communication circuit 125, such as a smart watch that communicates using Bluetooth.sup.™.

Other components 110 operable with the one or more processors 116 can include output components such as video, audio, and/or mechanical outputs. For example, the output components may include a video output component such as the display 102 or auxiliary devices including a cathode ray tube, liquid crystal display, plasma display, incandescent light, fluorescent light, front or rear projection display, and light emitting diode indicator. Other examples of output components include audio output components such as speaker port 132 or other alarms and/or buzzers and/or a mechanical output component such as vibrating or motion-based mechanisms.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

In one or more embodiments, the one or more processors 116 are operable to receive, with the communication circuit 125, an incoming communication from a remote communication device. When this occurs, the one or more processors 116 can determine whether a person is within a thermal reception radius (411) of the one or more proximity sensor components 140. Where the person is not within the thermal reception radius (411), the one or more processors can perform a control operation in response to receiving the incoming communication. This process is shown generally in FIGS. 5-7, with additional features shown in FIGS. 8-15.

Figure 5:
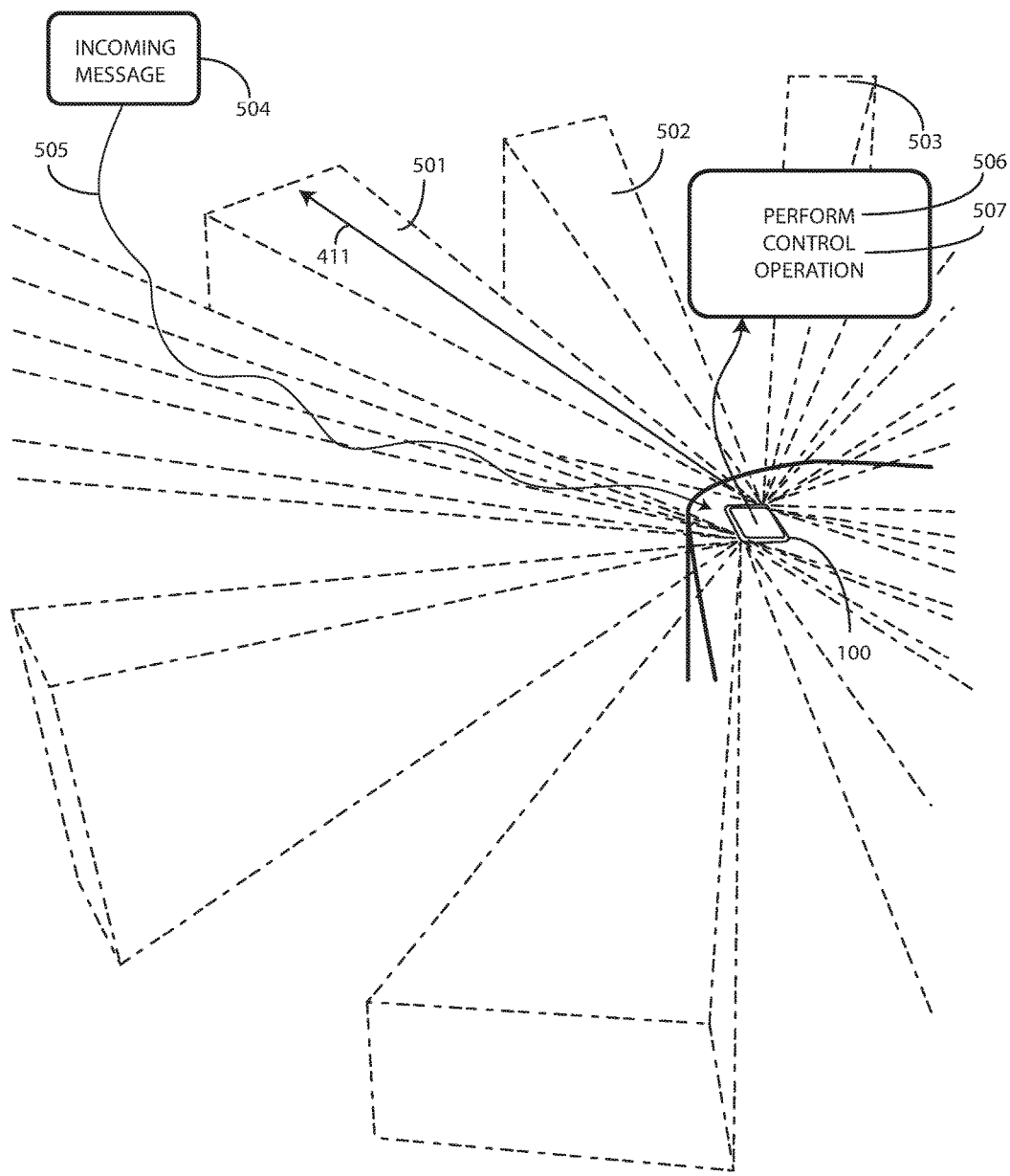
FIG. 5 illustrates one or more steps of an explanatory method using an explanatory device in accordance with one or more embodiments of the disclosure.

Beginning with FIG. 5, a user has activated, using the user interface (111) an automatic operation to occur when they are away from the electronic device 100. The one or more proximity sensor components (140) are in their active mode and are operating to receive infrared emissions from a distance indicated by thermal reception radius 411. The one or more proximity sensor components (140) are actively waiting to receive infrared emissions from an object external to the housing (101) of the electronic device 100. As shown in FIG. 5, one or more signal reception beams 501,502,503 can be defined within which infrared emissions are received as previously described above with reference to FIG. 3. In this embodiment, the signal reception beams 501,502,503 define a 360-degree reception area or heat sensor coverage zone about the device with a thermal reception radius 411 of about ten feet when the one or more proximity sensor components (140) are operating at the first sensitivity.

The electronic device 100 receives an incoming communication 504 from a remote communication device. Examples of incoming communication 504 include instant message messages, short message service messages, multimedia messages, electronic mail correspondence, or social media communications. Still other types of incoming communications 504 will be obvious to those of ordinary skill in the art having the benefit of this disclosure.

When the electronic device 100 receives 505 the incoming communication 504, in one embodiment the one or more processors (116) determine whether a person is within the thermal reception radius 411, or alternatively whether the person has been within the thermal reception radius 411 for a predefined period, such as five or ten 10 minutes. Here, no person is within the thermal reception radius 411. This is determined when the proximity sensor components (140) fail to receive infrared emissions. When this occurs, i.e., where the person is not within the thermal reception radius, in one embodiment the one or more processors perform 506 a control operation 507 in response to receiving 505 the incoming communication 504.

Figure 6:
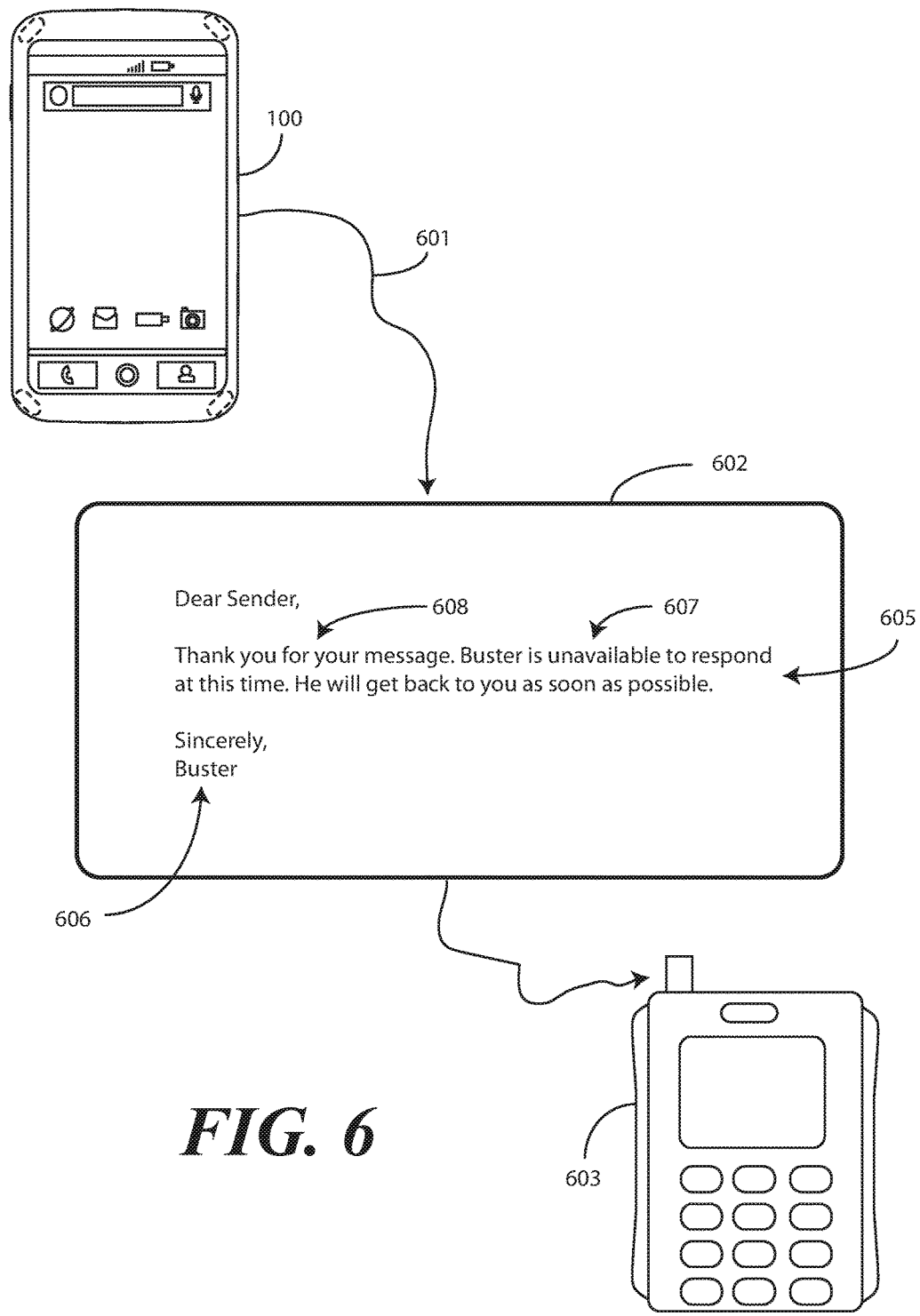
FIG. 6 illustrates one or more steps of an explanatory method using an explanatory device in accordance with one or more embodiments of the disclosure.

Turning now to FIG. 6, in one embodiment, the control operation (507) comprises delivering 601, with the communication circuit (125) of the electronic device 100 a response message 602 to the remote communication device 603 from which the incoming communication (504) was received. In one or more embodiments, the response message 602 is user definable. For example, a user can define within a menu setting accessible from the user interface what the response message 602 should say using the user interface (111) of the electronic device 100. In other embodiments, a user can select from one or more default message templates to populate the content of the response message 602.

In one embodiment, the response message 602 comprises a preformatted response message comprising indicia 605 that the person 606 is at least temporarily unable 607 to respond to the incoming communication (504). The response message 602 can also include an acknowledgement receipt 608 that the incoming communication (504) was received. For example, in this illustration, the response message 602 states, "Dear Sender, Thank you for your message. Buster is unavailable to respond at this time. He will get back to you as soon as possible. Sincerely, Buster." Other preformatted messages will be obvious to those of ordinary skill in the art having the benefit of this disclosure.

Figure 7:
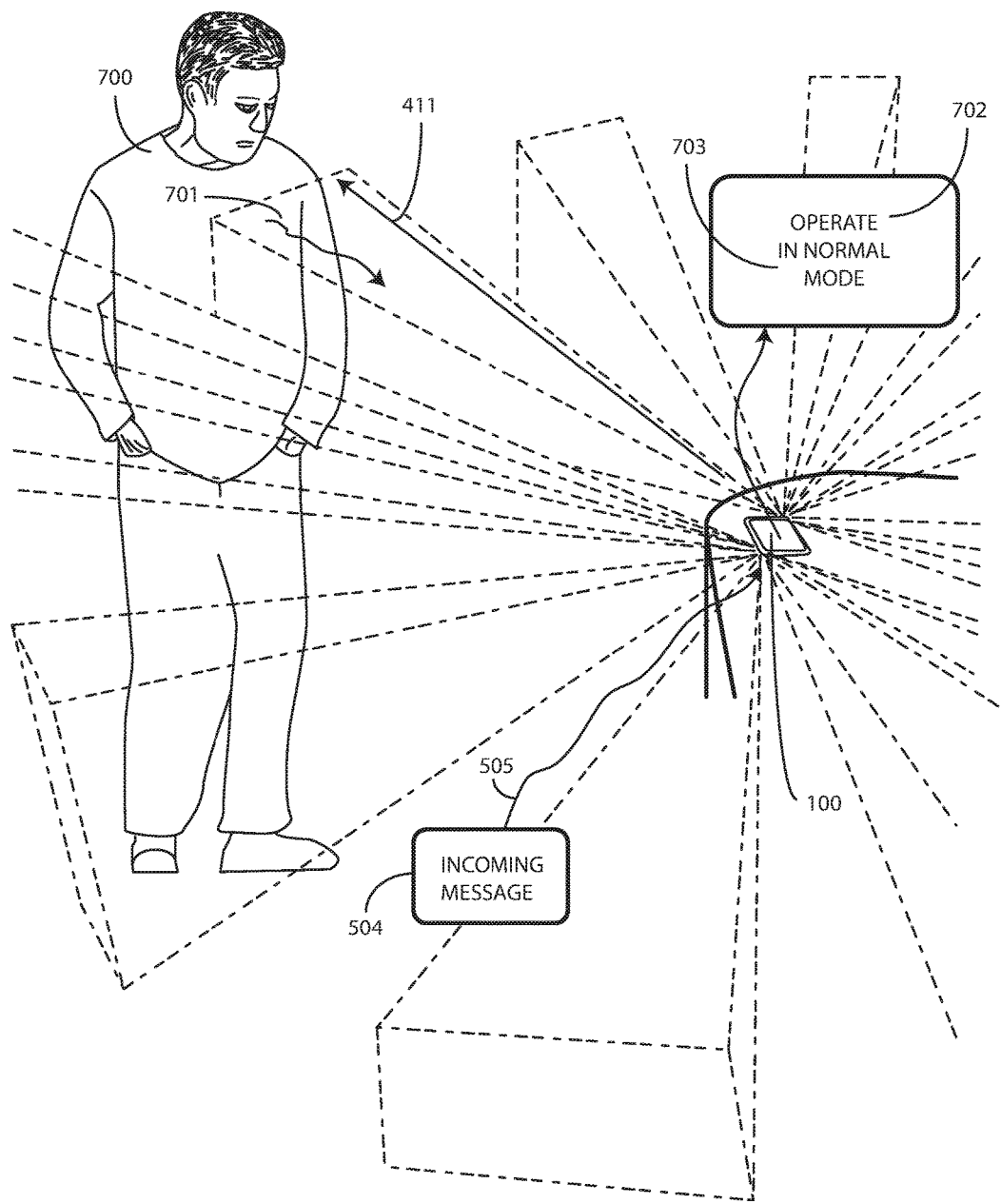
FIG. 7 illustrates one or more steps of an explanatory method using an explanatory device in accordance with one or more embodiments of the disclosure.

The apparatus components and method steps of FIGS. 5-6 are in contrast to that shown in FIG. 7. Turning now to FIG. 7, in this example the user 700 is within the thermal reception radius 411 when the incoming communication 504 is received 505. The user's body heat results in an infrared emission 701 being delivered to the one or more proximity sensor components (140) of the electronic device 100. When this occurs, the one or more processors (116) of the electronic device 100 infer that the user 700 is near the electronic device 100. Accordingly, no response message (602) is automatically sent. Instead, the electronic device 100 operates 702 in its normal mode 703 of operation.

Figure 8:
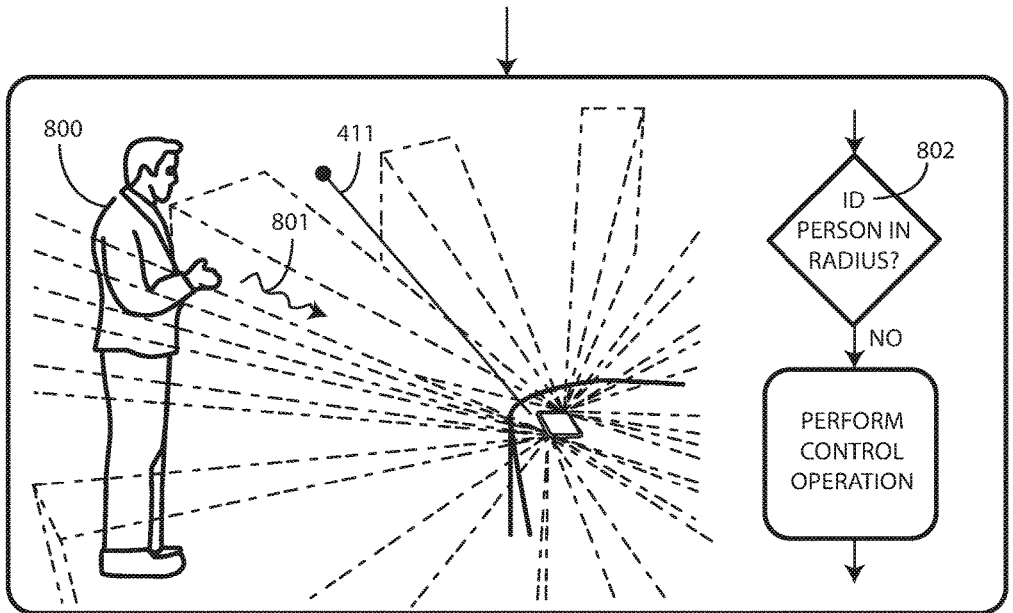
FIG. 8 illustrates one or more steps of an explanatory method using an explanatory device in accordance with one or more embodiments of the disclosure.

Recall from above that in one embodiment the electronic device 100 can include an intelligent imager (150) configured to capture an image of an object and determine whether the object matches predetermined criteria. The intelligent imager can include an identification module (151) having optical recognition such as include image recognition, character recognition, visual recognition, facial recognition, color recognition, shape recognition and the like. Alternatively, the electronic device 100 can have an identification module (151) operable with an audio input, such as a microphone included with the other sensors 109. Where this is the case, and where the one or more processors (116) determine that a person is within the thermal reception radius 411, in one embodiment the one or more processors (116) can optionally attempt to identify the person using one of these techniques. Turning now to FIG. 8, illustrated therein is one method in which this can occur.

As shown in FIG. 8, a person 800 is within the thermal reception radius 411 when the incoming communication 504 is received. The one or more processors (116) detect this due to the fact that infrared emissions 801 are received by the one or more proximity sensor components (140). Embodiments of the disclosure contemplate that the person 800 may not be the owner of the electronic device 100. Where this is the case, it may be beneficial to automatically reply to the incoming communication 504 to alert the sender that the owner of the electronic device 100 is away from the electronic device 100 and is unable to respond to the incoming communication 504.

Accordingly, in one or more embodiments, the one or more processors (116) can optionally attempt to identify 802 the person 800 or persons within the thermal reception radius 411 by capturing attribute data of the person 800. For example, in one embodiment when the one or more proximity sensor components (140) detect the person 800, the intelligent imager (150) can capture a photograph of that person 800. The identification module (151) can then compare the image to a reference file stored in memory (118) to confirm beyond a threshold authenticity probability that the person's face sufficiently matches the reference file. Examples of threshold authenticity probabilities include seventy, eighty, or ninety percent. Beneficially, optical recognition allows the one or more processors (116) to perform (506) the control operation (507) when the following two criteria are met: first, one or more persons 800 are within the thermal reception radius 411, and second, when the identification module (151) fails to confirm the identity of the one or more persons 800 beyond the threshold authenticity probability. Said differently, even though the person 800 or persons are within the thermal reception radius 411, when the owner of the electronic device 100 is away, it can be beneficial to automatically reply to incoming communications (504).

In other embodiments, the identification module (151) can be operable with an audio input, such as a microphone included with the other sensors (109). Accordingly, the identification module (151) can sample sounds when the one or more proximity sensor components (140) detect a person 800 within the thermal reception radius 411. The identification module (151) can then compare the sampled audio file to a reference file stored in memory (118), to confirm beyond a threshold authenticity probability that the person's voice profile sufficiently matches the reference file. Accordingly, in one or more embodiments the memory (118) can hold identification information that allows the identification module (151) to identify an owner of the electronic device 100 by comparing the captured audio information with the reference identification information in a voice identification process. While facial recognition and audio recognition are two possible ways of identifying a user in accordance with one or more embodiments, other identification techniques will be obvious to those of ordinary skill in the art having the benefit of this disclosure.

Figure 9:
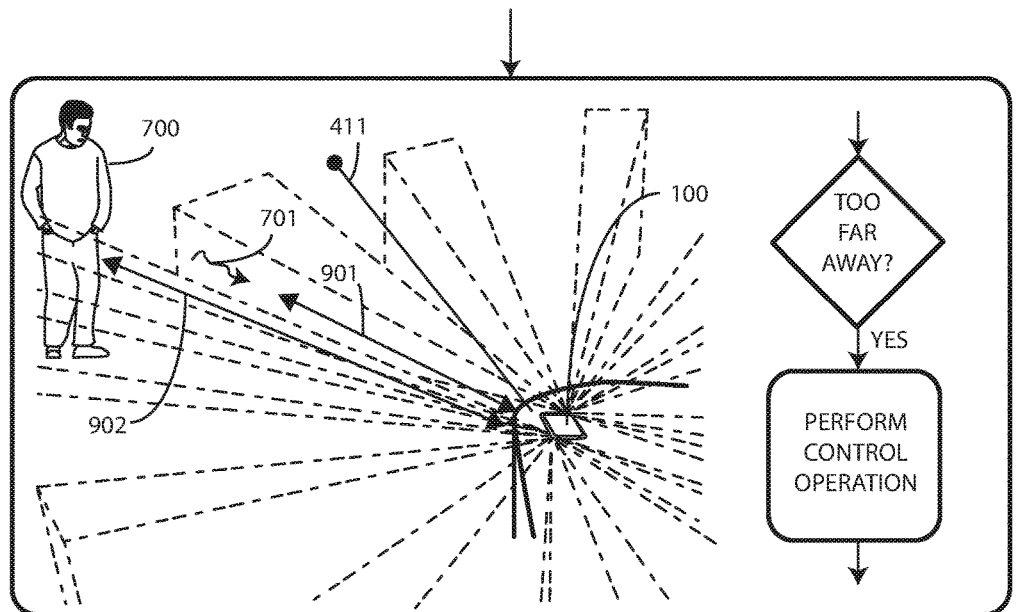
FIG. 9 illustrates one or more steps of an explanatory method using an explanatory device in accordance with one or more embodiments of the disclosure.

As noted above, embodiments of the disclosure are wildly user configurable. Some users, for instance, may want their electronic device 100 to send automatic responses to senders anytime the electronic device 100 is not in their hands. Accordingly, they may want to send automatic responses even when they are within the thermal reception radius 411. Embodiments of the disclosure accommodate this functionality. Turning now to FIG. 9, illustrated therein are how one or more embodiments work.

As shown in FIG. 9, the user 700 is within the thermal reception radius 411, but is quite far away from the electronic device 100. However, using the user interface (111) the user 700 has configured the electronic device 100 to send reply messages any time they are beyond a predefined distance 901 from the electronic device 100 for a period of time such as ten minutes. The predetermined period of time, which can be user definable, prevents nuisance messages from being sent when, for example, a user left the electronic device 100 only briefly to grab something from the refridgerator. In one or more embodiments, by detecting the strength, i.e., the magnitude, of infrared emissions (for stationary person or moving person), the one or more processors (116) can determine the distance 902 the user 700 may be from the electronic device 100. When the user 700 is closer, infrared emissions 701 received by proximity sensor components (140) will be stronger than when the user 700 is farther away. Using this information, the one or more processors (116) can determine more precisely the distance 902 of the user 700 from the electronic device 100 from the strength of the infrared emissions 701. Accordingly, the one or more processors (116) can perform (506) the control operation (507) when the user 700 is within the thermal reception radius 411 but the distance 902 between the user 700 and the electronic device 100 exceeds a predetermined threshold such as four, five, six, seven, or eight feet. Other predetermined distance thresholds will be obvious to those of ordinary skill in the art having the benefit of this disclosure.

Figure 10:
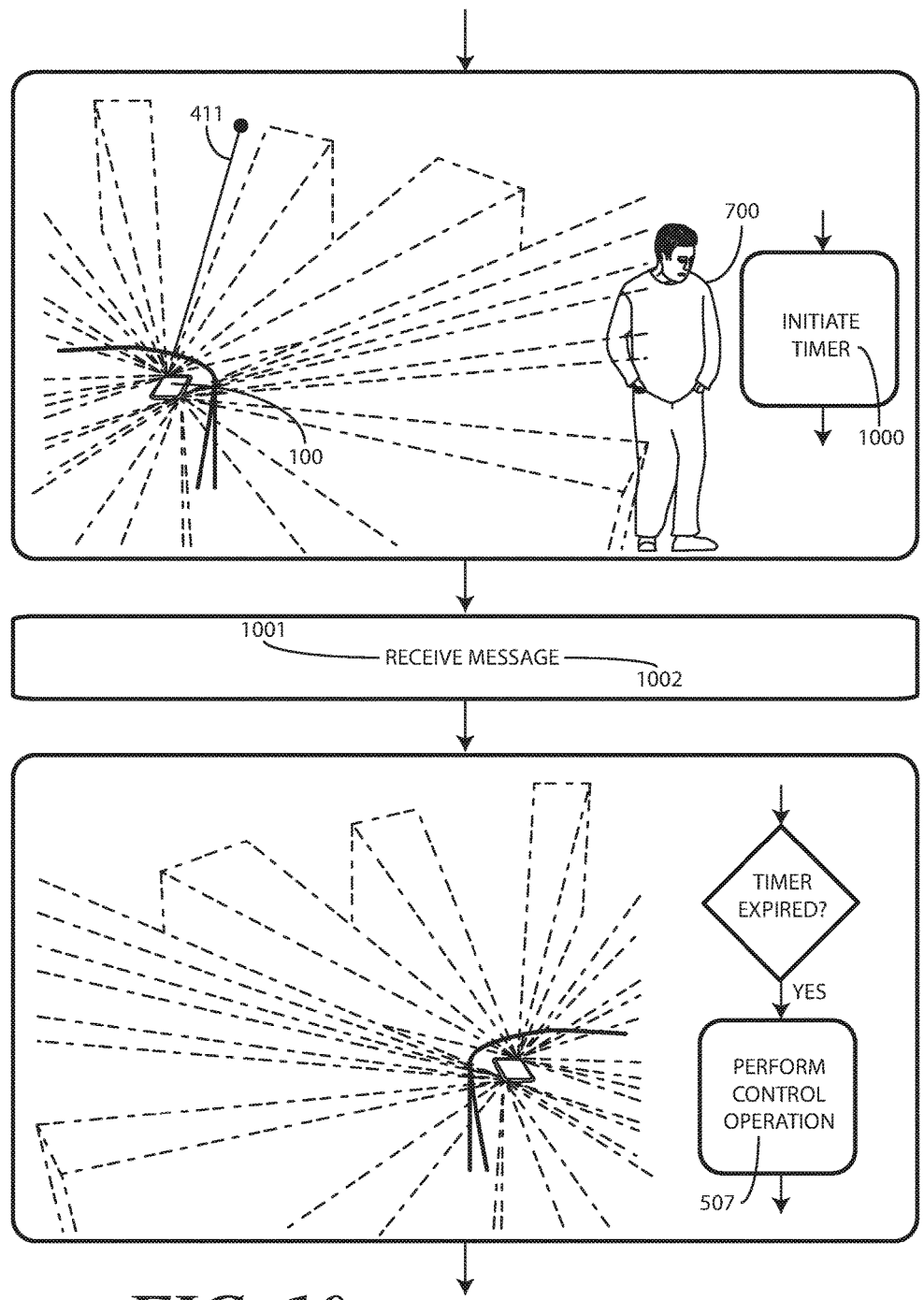
FIG. 10 illustrates one or more steps of an explanatory method using an explanatory device in accordance with one or more embodiments of the disclosure.

Turning now to FIG. 10, illustrated therein is another function of one or more embodiments of the disclosure. As noted above, the user 700 may not want the electronic device 100 to deliver automatic response messages when they have been away from the electronic device 100 for only a few moments. Accordingly, in one or more embodiments, the electronic device 100 comprises a timer 1000. When the user 700 exits the thermal reception radius 411, in one embodiment the one or more processors (116) can initiate the timer 1000. Said differently, when the one or more proximity sensor components (140) fail to detect the user 700 within the thermal reception radius 411, in one embodiment the one or more processors (116) can start the timer 1000.

Upon receipt 1001 of an incoming message 1002, in one embodiment the one or more processors (116) check to see if the timer 1000 has expired. In one embodiment, only after the expiration of the timer 1000 will the control operation 507, e.g., sending a response message (602) in response to receiving 1001 the incoming message 1002, be performed.

Figure 11:
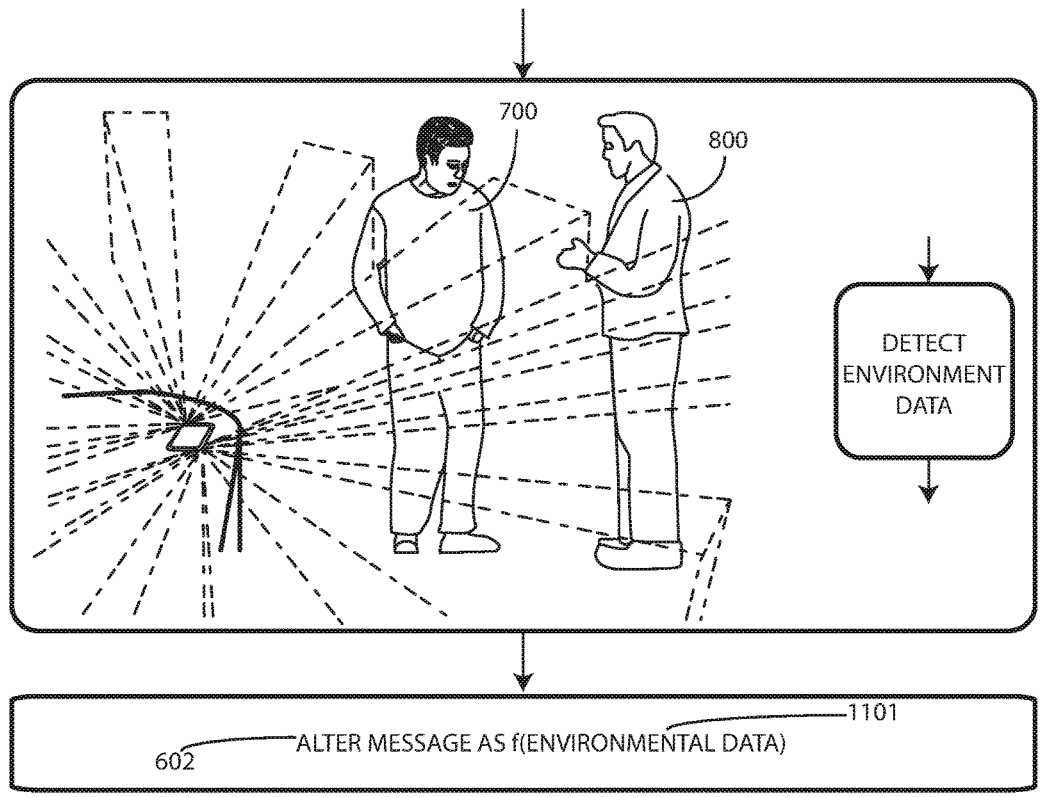
FIG. 11 illustrates one or more steps of an explanatory method using an explanatory device in accordance with one or more embodiments of the disclosure.

There are still other situations in which the user 700 may want an automatic reply message to be sent despite the fact that the user 700 is within the thermal reception radius 411. Turning now to FIG. 11, illustrated therein is one such situation.

As shown in FIG. 11, the user 700 is having a meeting with another person 800. Accordingly, the user 700 is preoccupied and unable to respond to incoming communications (504). In one embodiment, the one or more processors (116) can use the other sensors (109), such as a microphone or imager, to collect environmental data. In this illustration, the one or more processors (116) might use the microphone and the identification module (151) to detect samples of speech from the meeting. The identification module (151) can then determine that one of the voices is that of the user 700. However, the other voice, i.e., the voice of the other person 800, will not be identified. The one or more processors (116) can then infer that the user 700 is conducting a meeting, caucus, conference, or other business.

Figure 12:
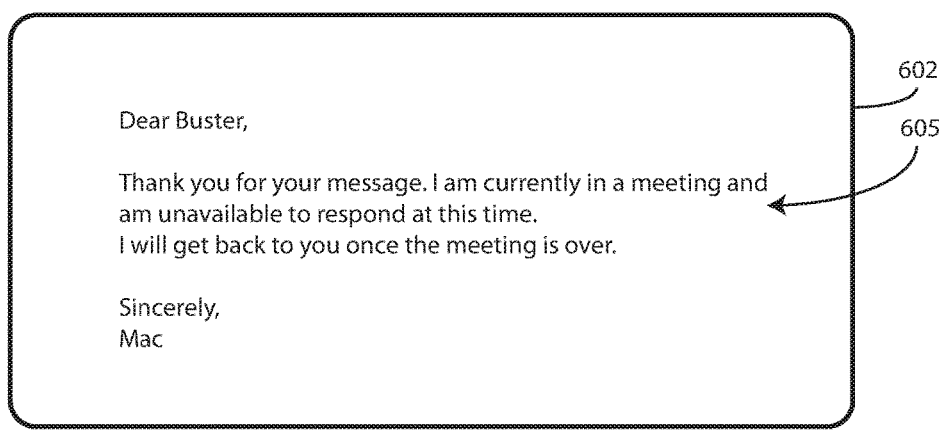
FIG. 12 illustrates one explanatory reply message in accordance with one or more embodiments of the disclosure.

Accordingly, in one embodiment, the response message 602 can be altered as a function 1101 of the environmental data. As shown in FIG. 12, the indicia 605 or content of the response message 602 may be changed to indicate that the meeting, caucus, conference, or other business is occurring. In this illustration, the indicia 605 or message content states, "Dear Buster, Thank you for your message. I am currently in a meeting and am unavailable to respond at this time. I will get back to you once the meeting is over. Sincerely, Mac." Other examples of environmental data, such as a room being dark to suggest the user 700 is asleep, as well as other functions 1101 of changing the response message 602 in light of this environmental data, will be obvious to those of ordinary skill in the art having the benefit of this disclosure.

Figure 13:
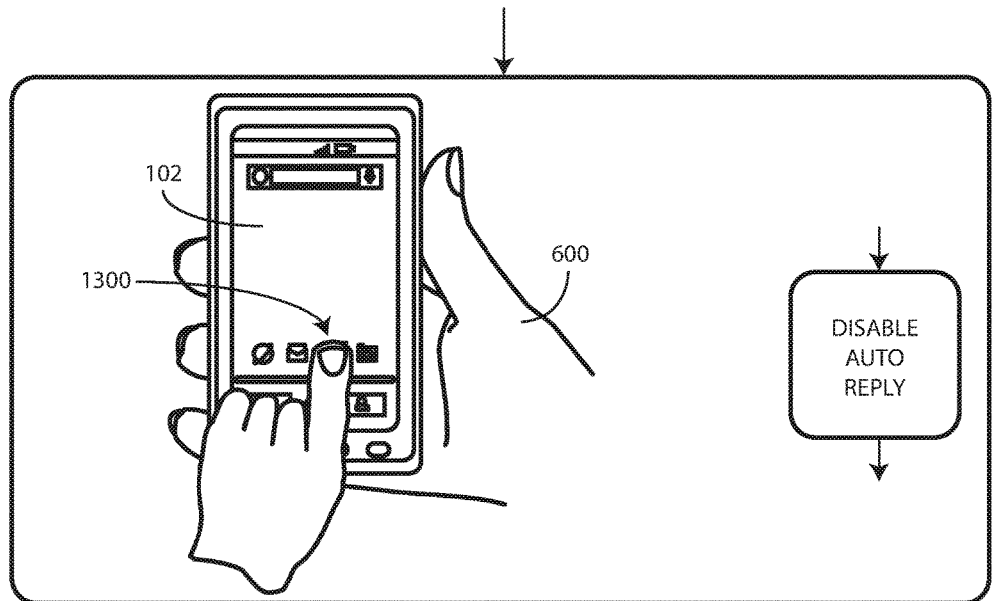
FIG. 13 illustrates one or more steps of an explanatory method using an explanatory device in accordance with one or more embodiments of the disclosure.
Figure 14:
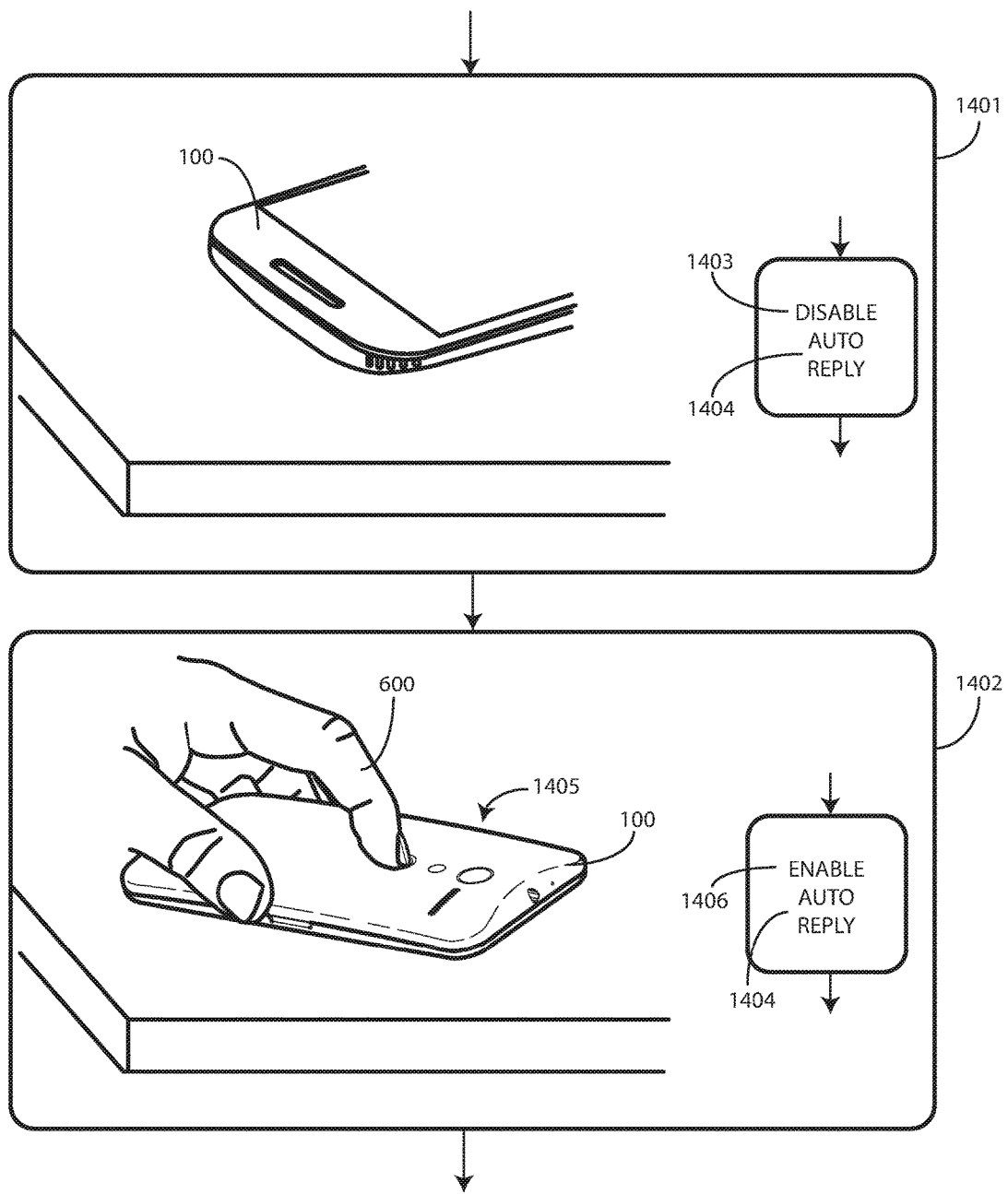
FIG. 14 illustrates one or more steps of an explanatory method using an explanatory device in accordance with one or more embodiments of the disclosure.

In one or more embodiments, the user 700 can preclude the transmission of response messages. This can occur in any number of ways. FIGS. 13-14 illustrate two. Others will be obvious to those of ordinary skill in the art having the benefit of this disclosure.

Beginning with FIG. 13, in one or more embodiments the automatic message reply functionality must be enabled by a user 700 through a user-interface menu setting. This requirement allows the user 700 to select times at which the automatic replies are sent. In FIG. 13, the user 700 is delivering touch input 1300 to the display 102 by touching a user interface target. Touching this user interface target disables the automatic message reply functionality, and therefore serves as a user override delivered to a user interface (111) of the electronic device 100 to preclude performance (506) of the control operation (507). In a similar fashion, the user 700 can reactivate the automatic message reply functionality at the time of their choosing.

Embodiments of the disclosure contemplate that the user 700 may want simpler methods of actuating and deactuating the automatic reply feature set. For example, when they are going to bed, they may not want to have to navigate menus or user actuation targets to turn ON or OFF the automatic message response feature. Turning now to FIG. 14, illustrated therein is one such method.

Recall from the discussion of FIG. 1 above that, in one or more embodiments, the electronic device 100 can be equipped with an accelerometer (152). The accelerometer (152) can detect an orientation of the electronic device 100. Accordingly, the automatic message reply functionality can be selective actuated as a function of orientation.

In this illustration, at step 1401 the electronic device 100 is in a first orientation, which is face up. In one embodiment, the one or more processors (116) detect this orientation and disable 1403 the automatic reply functionality 1404. Thus, when the electronic device 100 is face up, the one or more processors (116) preclude responding to incoming messages.

However, as shown at step 1402, when the user 700 flips the electronic device 100 over to a face down orientation, in one embodiment the one or more processors (116) enable 1406 the automatic reply functionality 1404 and respond to incoming messages when the electronic device 100 is in this orientation. Using this simple example, if a user 700 going to sleep wants to be notified—and to respond to—incoming messages, they can simply leave the electronic device 100 face up. However, if they want a good night's sleep and want the electronic device 100 to automatically reply to incoming messages, they can simply turn the electronic device 100 face down. While this is one illustrative example of controlling the automatic reply functionality 1404, others will be obvious to those of ordinary skill in the art having the benefit of this disclosure.

Figure 15:
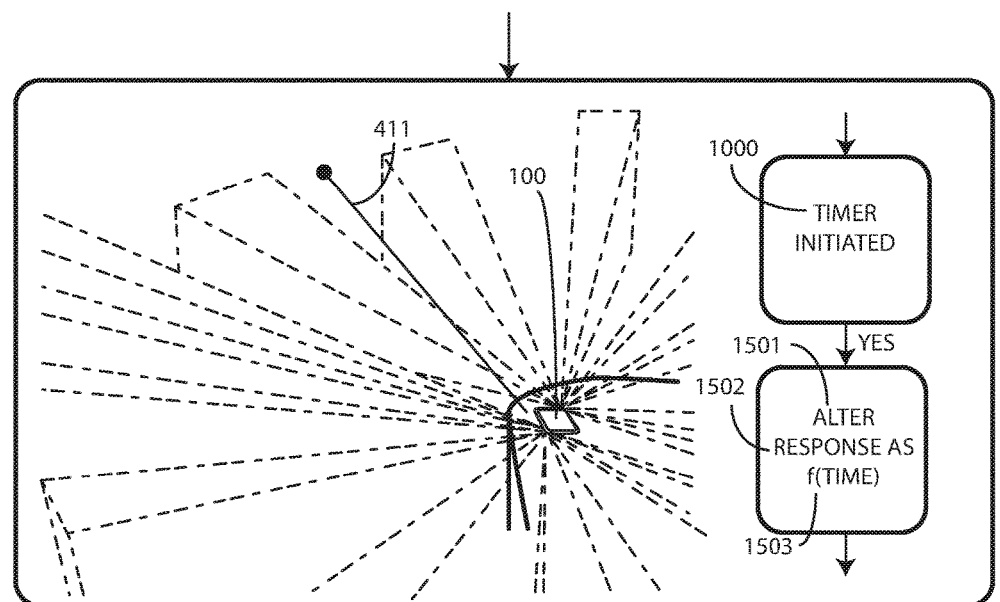
FIG. 15 illustrates one or more steps of an explanatory method using an explanatory device in accordance with one or more embodiments of the disclosure.

Turning now to FIG. 15, a timer 1000 is initiated when the user (700) leaves the thermal reception radius 411. Rather than counting down, this timer counts up to determine how long the user (700) has been away from the electronic device 100. When an incoming message is received, in one embodiment the one or more processors (116) can alter 1501 the response 1502 to the incoming message as a function 1503 of an amount of time the person has been outside the thermal reception radius 411. For example, if the user (700) has been away for only a short time, the response 1502 might say, "Sorry, Buster just stepped away. He will reply when he returns." By contrast, if the user (700) has been away for a longer time, the response 1502 might say, "Buster is diligently working on a project, which may take a while. He will respond in due course." Other examples of how to alter 1501 the response 1502 will be obvious to those of ordinary skill in the art having the benefit of this disclosure.

Figure 16:
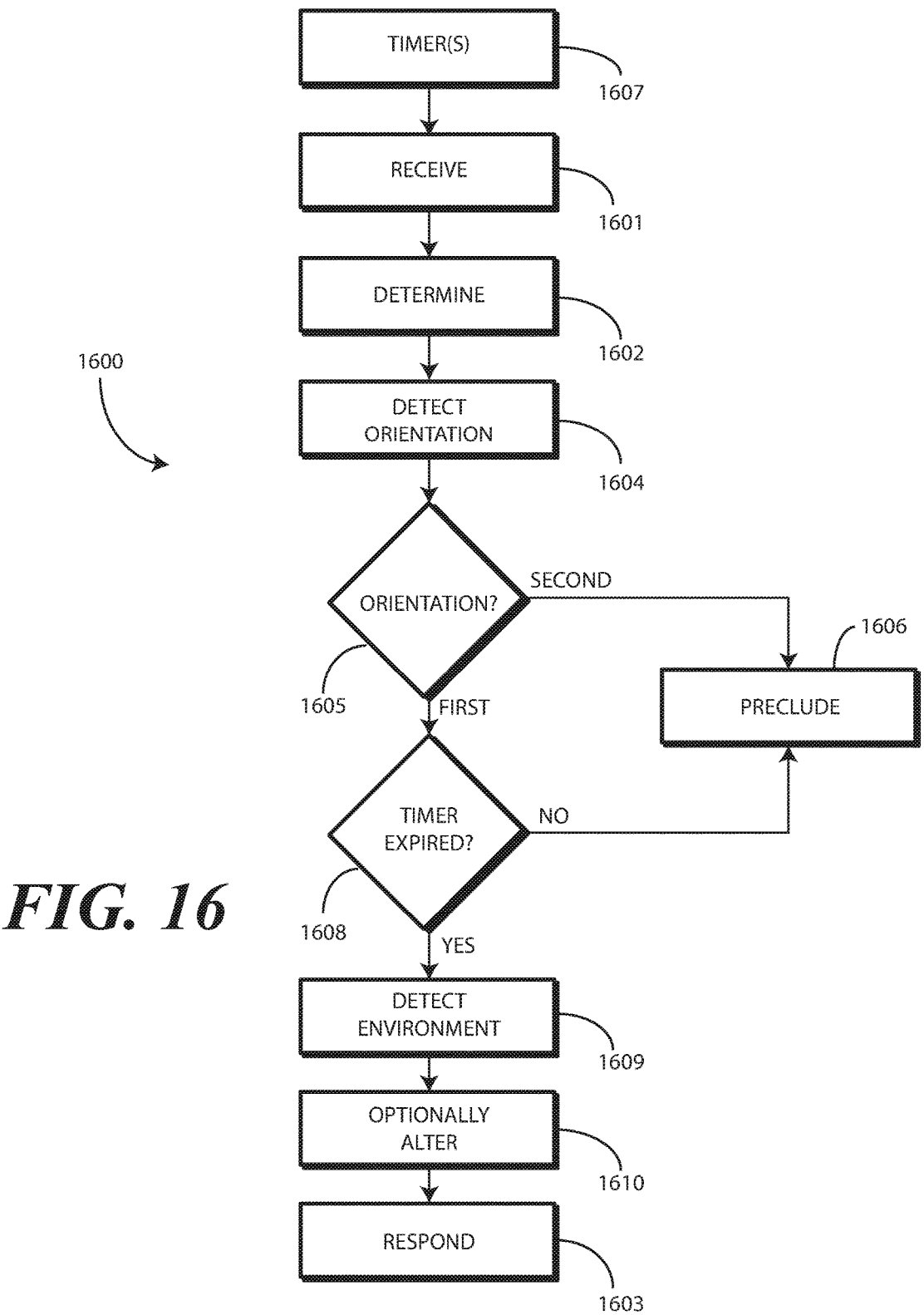
FIG. 16 illustrates one explanatory method in accordance with embodiments of the disclosure.

Turning now to FIG. 16, illustrated therein is one explanatory method 1600 for controlling an electronic device configured in accordance with one or more embodiments of the disclosure. At step 1601, the method 1600 receives, with a communication circuit, an incoming message from a remote device. Examples of incoming messages include electronic mail correspondence, social medial correspondence, instant messages, short message service messages, multimedia messages, and other types of communications.

At step 1602, the method 1600 determines, with one or more proximity sensor components, whether a person is within a thermal reception radius of the electronic device. At step 1603, where the person is not within the thermal reception radius, the method 1600 automatically responds, with one or more processors, to the incoming message.

In one embodiment, step 1603 comprises delivering a response message to the remote device. In one embodiment, the response message comprises an indication that the person is unable to respond to the incoming message. In one embodiment, the response message further comprises an acknowledgement of receipt of the incoming message.

In one or more embodiments, a user can selectively actuate or deactuate the automatic response occurring at step 1603. For example, at optional step 1604, the method 1600 can detect, with an accelerometer, an orientation of the electronic device. At optional decision 1605, the method 1600 can determine whether the electronic device is in a first orientation or a second orientation. In one embodiment, where the electronic device is in the first orientation, the method 1600 proceeds to step 1603 to respond to the incoming message. However, where the electronic device is in the second orientation, in one embodiment the method 1600 can proceed to 1606, which will preclude responding to the incoming message.

In one or more embodiments, an optional timer can be initiated at optional step 1607. In one or more embodiments, the timer is initiated when any people within the thermal reception radius of the one or more proximity sensors leave the thermal reception radius. Where the timer is used, in one embodiment at optional decision 1608 the method 1600 can determine whether the timer has expired. In one embodiment, the method 1600 only proceeds to step 1603 to respond to the incoming message after the timer has expired.

In one or more embodiments, at optional step 1609, one or more sensors of the electronic device can receive background data prior to responding to the incoming message. The background data can include data captured by an imager, sounds captured by a microphone, a number of persons detected by the proximity sensor components, wireless communications from a local area wireless protocol such as Bluetooth. sup.™, motion data received through a sensor like an accelerometer or gyroscope, or other environmental information. Where this information is captured at optional step 1609, the response message sent at step 1603 can optionally be altered as a function of the environmental data. If, for example, one or more processors of the electronic device determine that a meeting is occurring, or that the user is on the phone, the response message sent at step 1603 may indicate that the user is unable to respond because they are on the phone or in a meeting. Other examples of response message modifications will be obvious to those of ordinary skill in the art having the benefit of this disclosure.

Modifying messages as a function of background data is not the only way to modify a response message. Illustrating by example, where another an optional timer can be initiated at optional step 1607. Rather than counting down from the time people leave the thermal reception radius, this second timer can count up. Accordingly, the second timer can indicate how long a person has been away from the electronic device. Where this occurs, at optional step 1610 the method 1600 can alter the response to the incoming message sent at step 1603 as a function of an amount of time the person has been outside the thermal reception radius. Other examples of bases for modifying response messages will be obvious to those of ordinary skill in the art having the benefit of this disclosure.

Figure 17:
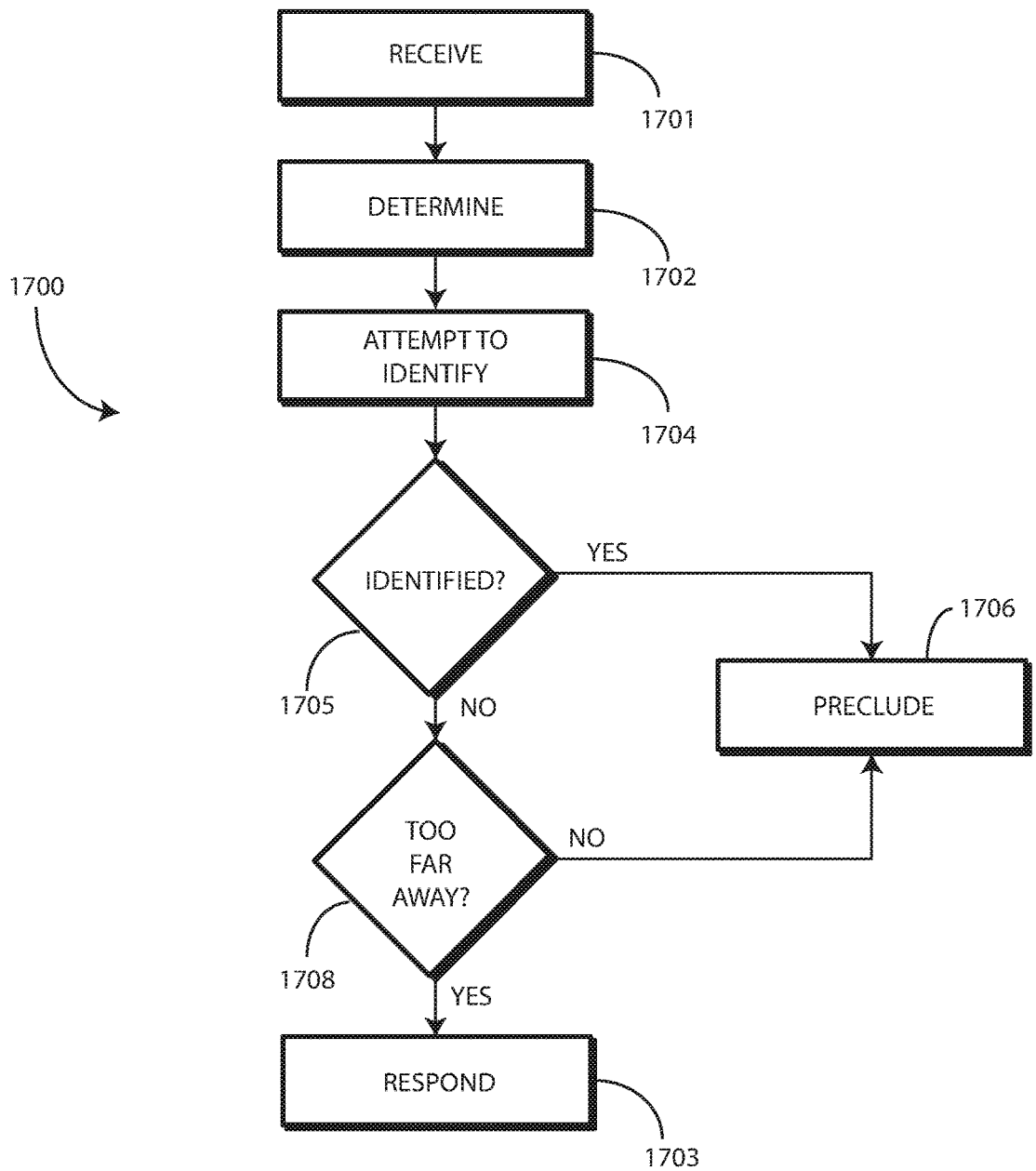
FIG. 17 illustrates another explanatory method in accordance with one or more embodiments of the disclosure.

It can sometimes be beneficial to transmit response messages even when a person is within the thermal reception radius. For example, as noted above people other than the owner of the device can be within the thermal reception radius. So long as the owner is not present, it may be advantageous to send an automatic response. In still other cases, the owner may be detectable, but too far away to respond quickly. The owner may have defined user preferences in the electronic device to respond automatically whenever they were more than, say, five feet from the device. Turning now to FIG. 17, illustrated therein is one explanatory method 1700 of how this might occur.

At step 1701, the method 1700 receives, with a communication circuit, an incoming message from a remote device. At step 1702, the method detects one or more persons within the thermal reception radius.

At optional decision 1703, in one embodiment the method 1700 attempts to identify the one or more persons beyond a threshold authenticity probability. This decision can be made using input from an intelligent imager and an identification module or a microphone and an identification module. Other identification techniques will be obvious to those of ordinary skill in the art having the benefit of this disclosure.

In one embodiment, where the user is not sufficiently identified as the owner of the electronic device, step 1704 comprises delivering a response message to the remote device. In one embodiment, the response message comprises an indication that the person is unable to respond to the incoming message. In one embodiment, the response message further comprises an acknowledgement of receipt of the incoming message. Where the user is sufficiently identified as the owner, the method 1700 may proceed to step 1705, which will preclude responding to the incoming message.

At optional decision 1706, the method 1700 can determine whether the user is more than a predetermined distance from the electronic device. In one embodiment, where the user more than a predefined distance threshold from the electronic device, and optionally for at least a predetermined amount of time window, the method 1700 can proceed to step 1704, which comprises delivering a response message to the remote device. Where the user is less than the predefined distance threshold from the electronic device, the method 1700 may proceed to step 1705, which will preclude responding to the incoming message. Other techniques for determining whether to send the response message will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An electronic device, comprising:
a housing;
one or more processors;
at least one proximity sensor component operable with the one or more processors and comprising an infrared signal receiver receiving an infrared emission from an object external to the housing;
at least one sensor;
a memory;
an identification module; and
a communication circuit;
the one or more processors receiving, with the communication circuit, an incoming communication from a remote communication device and determining whether a person is within a thermal reception radius of the at least one proximity sensor component;
where the person is within the thermal reception radius, the identification module attempting to determine an identity of the person; and
where the person is not within the thermal reception radius, the one or more processors performing a control operation in response to receiving the incoming communication;
the identification module operable with the at least one sensor to compare attribute data received from the at least one sensor with a reference file stored in the memory to confirm an identity of the person beyond a threshold authenticity probability.

2. The electronic device of claim 1, the control operation comprising delivering, with the communication circuit, a preformatted response message to the remote communication device.

3. The electronic device of claim 2, the preformatted response message comprising indicia indicating that the person is at least temporarily unable to respond to the incoming communication.

4. The electronic device of claim 2, the preformatted response message comprising a user definable message.

5. The electronic device of claim 1, further comprising a timer, the one or more processors further operable to:
upon failing to detect the person within the thermal reception radius, initiate the timer; and
perform the control operation only after expiration of the timer.

6. The electronic device of claim 1, the at least one sensor comparing a sampled audio file to the reference file stored in the memory to confirm the identity of the person beyond the threshold authenticity probability.

7. The electronic device of claim 1, the one or more processors to also perform the control operation when:
   one or more persons are within the thermal reception radius; and
   the identification module fails to confirm the identity of any of the one or more persons beyond the threshold authenticity probability.

8. The electronic device of claim 7, the at least one sensor one or more of an intelligent imager or a microphone.

9. The electronic device of claim 1, further comprising a user interface, the one or more processors operable to receive a user override from the user interface to preclude performance of the control operation.

10. The electronic device of claim 1, the one or more processors to, when the person is within the thermal reception radius, determine a magnitude of the infrared emission to determine a distance of the person from the housing, the one or more processors also to perform the control operation where the distance exceeds a predefined threshold.

11. The electronic device of claim 1, further comprising:
   at least one sensor, the one or more processors to receive environmental data with the at least one sensor; and
   the control operation comprising delivering, with the communication circuit, a preformatted response message to the remote communication device;
   wherein content of the preformatted response message changes as a function of the environmental data.

12. A method for controlling an electronic device, comprising:
   receiving, with a communication circuit, an incoming message from a remote device;
   receiving background data prior to responding to the incoming message;
   determining, with one or more proximity sensor components whether a person is within a thermal reception radius of the electronic device;
   altering a response to the incoming message as a function of the background data;
   where the person is within the thermal reception radius of the electronic device, attempting, with an identification module, to identify the person as a owner of the electronic device; and
   where the person is not within the thermal reception radius, automatically responding, with one or more processors, to the incoming message.

13. The method of claim 12, the responding comprising delivering a response message, with the communication circuit, to the remote device.

14. The method of claim 13, the response message comprising an indication that the person is unable to respond to the incoming message.

15. The method of claim 14, the response message further comprising an acknowledgement of receipt of the incoming message.

16. The method of claim 12, further comprising:
   detecting, with an accelerometer, an orientation of the electronic device;
   responding to the incoming message when the electronic device is in a first orientation; and
   precluding responding to the incoming message when the electronic device is in a second orientation.

17. The method of claim 12, further comprising:
   detecting one or more persons within the thermal reception radius;
   attempting to identify the person from the one or more persons beyond a threshold authenticity probability; and
   also responding to the incoming message upon failing to identify the person from the one or more persons beyond the threshold authenticity probability.

18. The method of claim 12, further comprising:
   when the person leaves the thermal reception radius, initiating a timer; and
   responding to the incoming message only after expiration of the timer.

19. The method of claim 12,
   wherein the background data comprises a number of persons detected by one or more sensors of the electronic device.

20. The method of claim 12, further comprising:
   when the person leaves the thermal reception radius, initiating a timer; and
   further altering the response to the incoming message as another function of an amount of time the person has been outside the thermal reception radius.

* * * * *